(12) United States Patent
Mayer et al.

(10) Patent No.: US 10,079,129 B2
(45) Date of Patent: Sep. 18, 2018

(54) ELECTRIC SWITCHING DEVICE FOR AN ENERGY ACCUMULATOR IN AN ELECTRIC VEHICLE

(71) Applicant: LION SMART GMBH, Garching (DE)

(72) Inventors: Tobias Mayer, Munich (DE); Daniel Quinger, Herrsching (DE); Martin Specht, Feldafing (DE); Sebastian Spirig, Widnau (CH); Marcel Straub, Buchs (CH)

(73) Assignee: LION SMART GMBH, Garching (DE)

( * ) Notice: Subject to any disclaimer, the term of this patent is extended or adjusted under 35 U.S.C. 154(b) by 0 days.

(21) Appl. No.: 15/323,634

(22) PCT Filed: May 29, 2015

(86) PCT No.: PCT/EP2015/061997
§ 371 (c)(1),
(2) Date: Jan. 3, 2017

(87) PCT Pub. No.: WO2016/000878
PCT Pub. Date: Jan. 7, 2016

(65) Prior Publication Data
US 2017/0148597 A1   May 25, 2017

(30) Foreign Application Priority Data

Jul. 4, 2014  (DE) .................. 10 2014 109 405

(51) Int. Cl.
*H01H 3/00* (2006.01)
*H01H 50/20* (2006.01)
(Continued)

(52) U.S. Cl.
CPC ............. *H01H 50/20* (2013.01); *B60K 28/14* (2013.01); *B60L 11/1851* (2013.01); *H01H 3/26* (2013.01);
(Continued)

(58) Field of Classification Search
CPC .................. H01H 19/11; H01H 3/503
(Continued)

(56) References Cited

U.S. PATENT DOCUMENTS

| 959,908 | A | * | 5/1910 | Barnum | ................ | H01H 19/11 200/11 R |
| 2,892,059 | A | * | 6/1959 | Keirans | ................ | H01H 51/084 335/122 |

(Continued)

FOREIGN PATENT DOCUMENTS

DE   02008063652 A1   6/2010

OTHER PUBLICATIONS

PCT/EP2015/061997, International Search Report dated Dec. 22, 2015, 7 pages.

*Primary Examiner* — Alexander Talpalatski
(74) *Attorney, Agent, or Firm* — Haynes Beffel & Wolfeld LLP; Andrew L. Dunlap

(57) ABSTRACT

The invention relates to an electric switching device (10) for an energy accumulator in an electric vehicle, comprising a housing (20) inside which at least one switching section (30) that includes two input contacts (32a, 32b) and at least one output contact (34) is arranged, and a rotary component (40) which is mounted in such a way as to be rotatable relative to the housing (20) about a switching axis (42) between at least one OFF position (I), a series-connecting position (II), and an ON position (III); said rotary component (40) includes at least one conductor (44) which has at least two conductor contacts (44a, 44b) and which connects the first input contact (32a) in an electrically conducting manner to the output contact (34) in the series-connecting position (II) and connects the second input contact (32b) in an electrically conducting manner to the output contact (34) of the at least one switching section (30) in the ON position (III).

18 Claims, 7 Drawing Sheets

Figure 1:
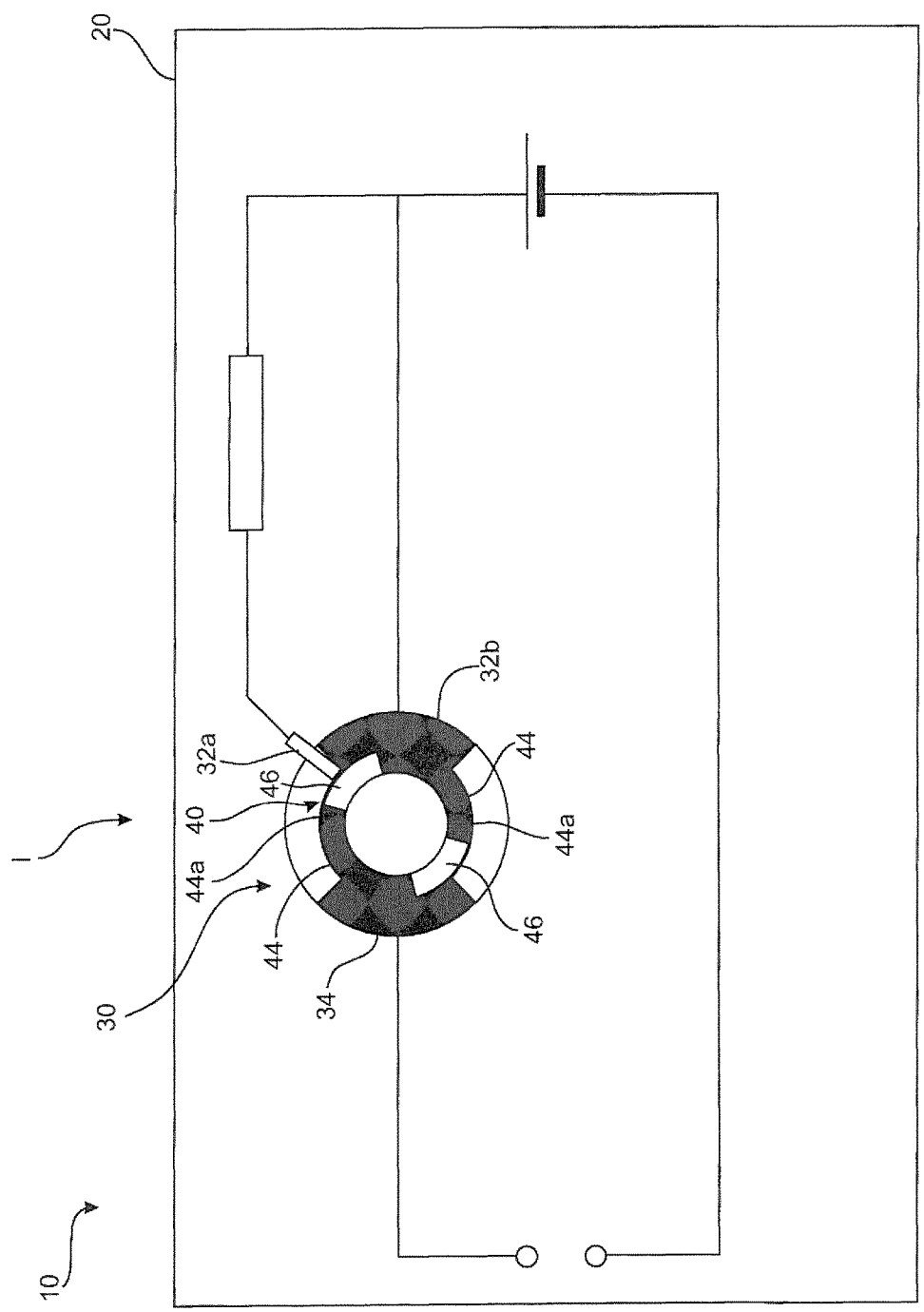

(51) Int. Cl.
  *H01H 39/00* (2006.01)
  *H01H 9/54* (2006.01)
  *H01H 50/54* (2006.01)
  *H01H 50/64* (2006.01)
  *H01H 3/26* (2006.01)
  *B60K 28/14* (2006.01)
  *B60L 11/18* (2006.01)

(52) U.S. Cl.
  CPC ............ *H01H 9/541* (2013.01); *H01H 39/00* (2013.01); *H01H 50/543* (2013.01); *H01H 50/643* (2013.01); *B60L 2270/20* (2013.01)

(58) Field of Classification Search
  USPC .................................................. 200/11 R–13
  See application file for complete search history.

(56) References Cited

U.S. PATENT DOCUMENTS

| | | | | |
|---|---|---|---|---|
| 2,934,680 A * | 4/1960 | Buchtenkirch | ......... | H01F 7/145 335/228 |
| 3,360,751 A * | 12/1967 | Gauthier | ................ | H01H 83/12 335/175 |
| 3,739,308 A * | 6/1973 | Paul | ....................... | H01H 19/63 335/140 |
| 3,873,951 A * | 3/1975 | Blake | ................... | H01H 51/084 335/138 |
| 3,965,450 A * | 6/1976 | Schilling | .................. | H01H 7/02 335/240 |
| 4,024,482 A * | 5/1977 | Lisnay | ................... | H01H 71/44 335/169 |
| 4,399,335 A * | 8/1983 | House | .................... | H01H 67/22 200/11 R |
| 4,572,931 A * | 2/1986 | Shiraishi | .............. | H01H 19/585 200/11 A |
| 4,725,801 A * | 2/1988 | Snyder | ................. | H01H 51/084 335/122 |
| 5,394,070 A * | 2/1995 | Jacobsen | ................ | G01B 7/003 200/11 R |
| 5,912,537 A * | 6/1999 | Yang | ..................... | E05F 15/695 318/265 |
| 6,154,201 A * | 11/2000 | Levin | ................. | G01C 21/3664 345/156 |
| 6,987,508 B2 * | 1/2006 | Numata | ................... | G05G 1/10 345/161 |
| 7,067,745 B2 * | 6/2006 | Holt | ..................... | H01H 27/002 200/11 R |
| 2012/0229234 A1 | 9/2012 | Wakabayashi | | |
| 2014/0131179 A1 | 5/2014 | Ho et al. | | |

* cited by examiner

ELECTRIC SWITCHING DEVICE FOR AN ENERGY ACCUMULATOR IN AN ELECTRIC VEHICLE

The present invention relates to an electric switching device for an energy accumulator in an electric vehicle and to a method for switching a corresponding electric switching device.

It is well known that switching devices are used for switching energy accumulators of electric vehicles on and off. Such an energy accumulator can consist, for example, of a plurality of battery cells. In an electric vehicle an electric motor is then provided, which can deliver its power by means of an electrical connection to the energy accumulator. In particular in a crash situation, i.e. after serious accidents, it is necessary to disconnect the energy accumulator from the electric motor, as far as possible in a definite manner and in particular, as quickly as possible. For normal operating situations as well, it is necessary to connect and disconnect the electric motor to/from the energy accumulator between a switched-on state and a switched-off state. For this purpose, known electric switching devices usually comprise different relays which can implement the switching operations. Since it is essential, in particular during the switching on operation, to prevent the entire capacity of the energy accumulator from being immediately transferred to the electric motor, a so-called pre-charging circuit or series-connecting position is often necessary. In this series-connecting position, an additional high resistance is arranged within the circuit to be formed, in order to effectively limit the current flow that develops. Accordingly, in the case of known switching devices, individual relays are provided for both the series-connecting position and for the switched-on position as well as for all other switch positions. If additional functions are required in the switching device, such as an emergency off situation or an automatic emergency disconnection from the energy accumulator, then separate components are also provided. The whole set of these components is usually arranged in a so-called Battery Disconnect Unit (BDU).

A disadvantage of the known solutions is the amount of labour required and the high level of complexity in the assembly. Thus, due to the plurality of components a large number of errors can be expected to occur during assembly. This leads to complex test procedures to be able to ensure the reliability of the functionality and with low residual risk. In addition, due to the large number of separate components, the assembled size of the known switching devices is relatively large. Last but not least, the costs of producing the known switching devices are relatively high, because the plurality of components have a cumulative negative impact on the actual cost of the switching device.

The object of the present invention is to at least partially eliminate the disadvantages described above. In particular, the object of the present invention is to reduce, in an inexpensive and simple manner, the space requirement, the weight and/or the costs of the switching device.

The above object is achieved by an electric switching device having the features of claim 1 and by a method having the features of claim 17. Other features and details of the invention are obtained from the dependent claims, the description and the drawings. Features and details that are described in connection with the device according to the invention are also valid, of course, in connection with the method according to the invention, and vice versa, so that with regard to the disclosure, reference is or can always be made reciprocally to the individual aspects of the invention.

An electrical switching device according to the invention for an energy accumulator of an electric vehicle comprises a housing. In this housing at least one switching section is arranged, having two input contacts and at least one output contact. In addition, a rotational component is located within the housing, which is mounted relative to the housing such that it can be rotated between at least one OFF position, a series-connecting position and an ON position about a switching axis. This rotational component comprises at least one conductor having at least two conductor contacts. The conductor contacts and the conductor are designed to connect the first input contact in an electrically conducting manner to the output contact in the series-connecting position and to connect the second input contact in an electrically conducting manner to the output contact of the at least one switching section in the ON position.

In a switching device according to the invention therefore, the rotational component ensures a dual switching functionality in a single component. The rotational component can be rotated or turned, and therefore the individual switching positions can be precisely distinguished from one another, or occupied by the rotational component, on the basis of the different angular positions. In particular, the rotational component is designed as a hollow cylinder, wherein the cavity within the rotational component is used for housing additional components, in particular an electric motor.

Compared to the known switching devices then, due to the number of input contacts the corresponding number of individual switching relays can be reduced to a single component in the form of the rotational component. It is already evident here that a significant reduction in the complexity, weight and dimensions can thereby be achieved for the switching device according to the invention.

The housing in this case can directly form a corresponding Battery Disconnect Unit (BDU), or a part of such a BDU. Accordingly, the switching device is located between the energy accumulator and the electric motor and therefore, so to speak, within the electrical drive train. This makes it possible for the three positions for the rotational component to incorporate the following different electrical operating modes as functions. In the OFF position the rotational component is in an electrically isolating position, so that the output contact is not connected in an electrically conducting manner to any of the input contacts. This means that the circuit is disconnected and the electric motor therefore has no electrically conducting connection to the energy accumulator. If the rotational component is rotated further round into the series-connecting position, an electrically conducting connection is created between the first input contact and the output contact. The first input contact in this case is preferably in its other electrically conducting connection to a series resistor, so that the electrical circuit from the energy accumulator to the electric motor can then be closed via this series resistor. This means that during the power-up phase, the starting current of the electric motor is significantly limited by the series resistance.

Of course, the corresponding resistance can also be designed as a variable resistance, in order to implement an electric-vehicle-specific or even switching-situation-specific adaptation of this limitation. In this position therefore, the rotational component is in the series-connecting position.

If the rotational component is rotated further, a complete electrically conducting connection is formed between the second input contact and the output contact. This is the normal usage situation or operating situation, in which without additional resistance an electrically conducting connection exists between the energy accumulator and the electric motor. This means that the series resistor can of course also continue to be supplied with current in this situation, but due to the high resistance the major component of the current flows out of the second input contact and bypasses the resistor.

The design according to the invention not only achieves a reduction in the components and thus the costs, the space required and the weight, but also enables an advantage in terms of the switching safety. This means that when the device is switched on by the rotary movement, the series-connecting position must automatically be passed through before the ON position of the rotational component can be occupied. This means that, because of the mechanical or geometric correlation, it is therefore no longer possible to skip over the series-connecting position, so that any resulting damage to the electric motor and/or the energy accumulator by omission of the series-connecting position in known switching devices is completely eliminated. This makes clear that, in addition to the design advantages, increased operational safety is ensured by a switching device according to the invention.

It should also be noted that in the context of the present invention, an energy accumulator is designed only as a plurality of battery cells.

Of course, other energy accumulators can also be considered, such as capacitors, recuperation systems, flywheels or electrical power generating fuel cells, as energy accumulators within the meaning of the present invention.

A further advantage due to the rotational component according to the invention is the simplified actuation. Thus, in particular with regard to the implementation of the rotational movement, or even fixing of the rotational component in the respective switching position, a more simplified drive method can be found. As will be explained later, for example a magnetic drive and/or an electric motor drive can be used here.

The individual contacts, i.e. the conductor contacts, the input contacts and at least one output contact, are located at correspondingly different circumferential positions on a common circumferential line in relation to the switching axis of the rotational component. This ensures that by means of a sliding motion and the resulting constant contact of the rotational component with a surrounding contact component, the appropriate electrical contacting in accordance with the switching position is always actually achieved. This means that the contacts rub against each other, so to speak, and thus also provide a cleaning effect for the individual surfaces of the respective contacts. Due to the rotary design of the rotational component, it also becomes possible to install the conductor between the conductor contacts in substantially any desired geometrical manner along or within the rotational component. This enables within the rotational component, in particular in the inner cavity thereof, a free space to be created, which can be used for additional components. Such additional components for the interior or the internal space of the rotation component are, for example, a drive device, a reset device or a gearbox, which will be described in further detail later.

For the conductors, metallic materials are in particular used. For cost reasons, in particular a copper wire is used, but other metallic and electrically conducting materials can also be used, such as aluminium or similar material. Of course, it is also possible for other switching positions to be occupied by the rotational component in addition to the three switching positions described above. For example, an emergency-OFF switching position and/or a crash-OFF switching position can be provided, which in particular ensure additional conducting contacts with corresponding input contacts or output contacts. This means that using the rotational component a very large number of switching positions can be occupied which correspond to different functions of the electrical circuit, without in any way altering or increasing the complexity in terms of the switching operations. In particular due to the fact that, under a full load situation, currents in the range of approx. 600 A flow through the electric switching device according to the invention, the rotary switch function and the corresponding reduction of components result in a distinct advantage.

It is additionally advantageous that when switching off from the ON position a rotational movement takes place, which means that a lateral separation of the relevant conductor contact from the respective input contact or output contact is made. When disconnecting under full load, as can be the case in an emergency stop situation or in a crash situation, this disconnection often or almost always involves forming an electric arc. Due to the fact that the rotational movement draws this arc, as it were, into a narrow gap around the respective contact, a reduced space is made available for this arc. Due to this gap formation and the attraction of the arc into this gap, the low space availability means that the arc is kept small and is quickly extinguished. The gap, into which this arc is drawn, can also be designated as a spark gap or arc gap within the context of the present invention.

It can be advantageous if in an electrical switching device in accordance with the present invention a drive device, in particular comprising an electric motor, is provided for rotating the rotational component. This means that here, in addition to a manual rotation facility for the rotation component, which is also possible in principle, an automated actuation and switching facility is provided. By supplying current to the drive device, in particular by appropriately supplying current to the electric motor, the rotational movement is carried out, which forces an appropriate change to the switching position of the rotational component. This may be supported by an appropriate open-loop and/or closed-loop control mechanism, in order to control the drive device based on the particular switching position which is desired or necessary. Of course, an electric motor-driven design of the drive device is only one possibility. Thus, electromagnetic drive devices are also conceivable, as will be explained further in the following paragraph. It is a great advantage if the drive device is designed as an electrically operated drive device, making it, as it were, coherent with the electric circuit or the potential presence of a current supply within the electric vehicle. This can be used to ensure that, for example in conjunction with the reset device to be explained in further detail later, from a mechanical point of view an automatic reset is effected when the entire system is switched off, or becomes de-energized due to a crash.

It is advantageous furthermore, if in the case of an electrical switching device in accordance with the preceding paragraph the drive device comprises a solenoid and a conversion device for converting a translational movement of the solenoid into a rotational movement of the rotational component. This is a particularly advantageous solution for the drive device, because it is simple and inexpensive. A solenoid can preferably be used to implement a translational movement, wherein the conversion device can comprise, for example, an inclined edge or a screw-like shaft design. This means that the translational movement then ensures an appropriate guide functionality by means of the conversion device, which converts this translational movement into a rotational movement of the rotational component. This makes it possible, in addition to a simple and inexpensive design of the drive device, to ensure a reduced holding force, in particular with regard to the standard operating situation. Thus, for example, after the movement into the ON position, a simple, small holding force is sufficient to hold the solenoid in the corresponding ON position, or the translational position correlated with it, even against a strong return spring. Last but not least, the control of the individual switching operations is also particularly simple and inexpensive in such a design.

It is also advantageous if in an electrical switching device according to the invention, the conductor contacts, the input contacts and/or the output contact are designed as planar contact sections for making an electrical contact by the conductor in at least two rotary positions of the rotational component. This leads to a larger surface area for the transmission of electric current, so that the total contact resistance falls. In particular for transmitting large current intensities, contact sections of appropriately large area are provided. The planar contact sections can be designed substantially in the form of a cylindrical casing. Of course, more complex sections in the form of a casing are also conceivable in the context of the present invention, for example, the comb-shaped designs of the planar contact sections to be explained in further detail later. In each case therefore, a rotationally angular surface is provided, in order to allow the respective contacting in the different switching positions to be unambiguously defined in advance, and later occupied. In addition, due to the planar contacting, a corresponding friction force will also be generated during the switching motion. In other words the planar contact sections of the individual contacts rub against each other during the switching movement so that, as it were, a grinding motion is generated during the switching movement. This means that a cleaning function is additionally ensured, in order to prevent or remove rust particles, or similar symptoms of wear on the contact sections. The contact sections can both rest completely flat against one another or have point contacts. Two-point contacts or four-point contacts are preferable, wherein accordingly one point each on the inner side and on the outer side, or two points on the inside and two points on the outer side, produce the corresponding contact.

Further, it can be advantageous if in an electrical switching device the conductor contacts and/or the input contacts and/or the output contact comprise pre-tensioning means for providing a spring-loaded contact between the output contact and a conductor contact and/or between an input contact and a conductor contact. This pre-tensioning therefore means that the radial force, which acts radially towards the switching axis or away from it, allows an appropriate pre-tensioning of the individual contact surfaces with respect to each other. Active pre-tensioning means can be provided, for example using spring devices, which press the individual contacts against each other in an active manner by a corresponding spring force. Geometric designs of appropriate pre-tensioning means, for example using a wedge-shaped design, are also possible within the context of the present invention. In other words, the pre-tensioning means additionally provide, as it were, a repositioning or readjustment facility, which maintains the desired electrically conducting contact with high reliability in the event of wear of the individual contact sections of the conducting contacts.

It may also be advantageous if in an electric switching device according to the invention the rotational component comprises a mechanical reset device, in particular in the form of a spring device, for applying a return force to the rotational component in the direction of the OFF position. In particular, this involves a spring force which is provided by the mechanical reset device. In other words, this means that without application of any additional force the reset device continually moves the rotational component back in the direction of the OFF position. In particular, a corresponding abutment is provided which limits the return movement of the rotational component to the OFF position. This leads to the situation whereby in a zero-current situation, i.e. when no mechanical drive supplied with current any longer holds the rotational component in a different position or moves it into a different position, the mechanically designed reset device returns the rotational component automatically and securely back into the OFF position. In emergency OFF situations or crash situations, an additional functionality is therefore ensured here, which increases the safety of the electric switching device according to the invention. Such a corresponding reset device, in particular in the form of a spring device, can be designed, for example, directly as a torsion spring, to be able to provide a rotational force which acts directly for the reverse rotation of the rotational component. The bracing of the mechanical reset device for the corresponding return force is preferably provided on the corresponding housing of the switching device.

It is advantageous furthermore if in an electric switching device according to the invention, at least two switching sections are arranged in the housing that are axially offset relative to each other in the direction of the switching axis. Thus it can be advantageous if two or more switching sections within a single circuit correspondingly provide increased switching reliability. It is also possible that using a single rotational component, a multiplicity of two or any number of separate circuits are automatically switched in tandem. This means the individual switching sections can comprise the individual switching positions in an identical and correlated way. This means that when the first switching section is moved into the series-connecting position, the second switching section is accordingly moved into the series-connecting position as well. The same applies for the subsequent movement into the ON position or the reverse movement into the OFF position.

Of course, it is also conceivable that the switching sections activate different loads, and therefore a desired definite mechanical correlation is needed between different switching positions. Thus an appropriate circumferential offset of the corresponding contacts of the switching sections ensures that, for example, the first switching section can only be in the ON position when the second switching section is in the OFF position and vice versa. In addition to a further reduction of components, weight and cost, essentially arbitrarily complex connections of the individual switching phases can also be achieved easily and inexpensively by such a design.

It is also advantageous if in a switching device according to the invention an emergency switching device is provided for a highly-energetic, in particular pyrotechnic, disconnection of the electrically conducting connection by means of the conductor by a movement of the rotational component, the direction of motion of which is preferably different to a rotation about the switching axis. In particular in an emergency situation or a crash situation, it may be necessary to disconnect the circuit between the energy accumulator and the load in the form of the electric motor as quickly as possible, and above all with the maximum possible safety. A highly-energetic disconnection allows this only once, in particular in an irreversible manner, so that using a pyrotechnic drive, for example, the emergency switching device moves the rotational component along its switching axis in a translational manner. Due to this axial offset in the translation direction, the corresponding contacts automatically come out of their conductive connection, so that the circuits are safely and effectively disconnected. Of course, the highly energetic disconnection can also have other forms of movement, in particular a rotational form of movement, so that a reverse rotation into the OFF position can also be ensured with high energy, in particular pyrotechnically. In addition to pyrotechnic solutions, strong spring devices or compressed air can also be used in the context of this embodiment of the invention. This means that an additional component, namely the separate emergency switching device in the form of the known so-called cable cutters, which cut through the circuit using pyrotechnics, can be avoided, thereby achieving further reductions in complexity and cost.

It is also advantageous if in an electrical switching device according to the invention, an electrical clutch device is arranged between a drive device for the rotational component and the rotation component, wherein said clutch device blocks a movement of the rotational component in the direction of the OFF position when supplied with current and enables it without a current supply. Such a clutch device therefore allows the drive device to carry out a movement in the direction of the ON position automatically when current is flowing. If the current is cut off, for example due to an emergency switch position or a crash situation, this causes the clutch device to open and so automatically enable the movement of the rotational component in the direction of the OFF position. In the normal situation the clutch device thus holds the switching position currently occupied under the smallest possible force, while without the current supply, in particular in correlation with a mechanical reset device, the reset movement of the rotational component is, as it were, automatically enabled by the absence of a current supply. The power loss, which is now necessary as a holding force during normal usage due to the electrical clutch device, is significantly lower than would be the case under full current supply, for example through an electric motor, which would have to work against the mechanical reset device.

It is also advantageous if in an electrical switching device according to the invention the clutch device comprises a free-wheeling device for the drive unit, which transmits the driving force of the drive device for a rotation in the direction of the ON Position, and in the opposite direction defines a free-wheeling motion for the drive device. This leads to a further improvement, so that an active movement into the ON position is always facilitated. Switching off is then only ever possible via the reset device, in particular by switching off the current supply to the corresponding electrical clutch device. This takes a part of the safety-related functionality further into the mechanical operation of the free-wheel, which ensures an even further degree of independence from control technology.

It can also be an advantage if in an electrical switching device according to the invention the clutch device comprises a gearbox, in particular in the form of a planetary gearbox, for transmitting a driving force of the drive device onto the rotational component. This gearbox allows the device, in particular in an arrangement between a corresponding motorized drive device on the one hand and the rotational component on the other, to also work with smaller and faster or slower rotating motors. In addition, by means of the corresponding clutch, an electro-mechanical magnetic device can provide a blocking which is axially and laterally offset, which also gives rise to a significant reduction of the holding force.

It is also advantageous if in an electrical switching device according to the invention the rotational component, at least in some sections, is made from a conducting material, wherein the conductor contacts are formed by the arrangement of electrically insulating material next to the conductor contacts. This leads to a reduction of the manufacturing cost and of the production costs. Electrically insulating material can be, for example, a plastic coating, which accordingly exposes the defined conductors or the defined conductor contacts from an integral design of the rotational component. A very wide range of coating methods and coating materials can be used for this in the context of the present invention. A retrospective insertion of the conductor into an appropriate insulator of the rotation component is also possible in the context of this embodiment.

In an electrical switching device according to the invention it can also be advantageous if the at least one switching section comprises at least one third input contact and/or at least one second output contact for an electrically conductive connection by means of the conductor to an arc-extinguishing electrical component, in particular one of the following:

free-wheeling diode
fuse device
resistor

The above list is not exhaustive. In an emergency OFF situation the arc previously discussed is created when the contacts separate from each other. In order to reduce the energy accumulated by the arc, and in particular to protect the connected electronic and electrical components, this arc-extinguishing electrical component can now provide a corresponding energy reduction. For example, this can be caused by the melting of the fuse, by the active heating of a resistor or the appropriate energy dissipation capability of a diode.

In an electrical switching device according to the invention it is also advantageous if the conductor is aligned, at least in some sections, in particular completely, along the circumferential direction of the rotational component between the conductor contacts. As has already been discussed, according to the invention the conductor can be placed substantially freely within the rotational component. Arranged along the circumferential direction and in particular directly on the circumference of the rotational component, this design means that the conductor leaves the inner cavity and therefore the inner space of the rotational component free, or releases it. Within this inner cavity a plurality of different components can then be arranged, for example a drive unit, the gearbox, the reset device or similar device. In particular due to the construction of the conductor around the whole circumference, the contacting is further improved, as will be explained later with reference to the comb-like sections.

It can also be advantageous if in an electrical switching device according to the invention the conductor comprises a measuring section with a defined electrical resistance, wherein a measuring device is provided for determining the electric current in the measuring section. This allows, for example by the construction of an explicit thin point, the actual flow situation of electrical current through the switching device to be detected. A defined resistance in this thin point can provide such a measuring section, given a knowledge of the temperature dependence of this resistance. This enables separate measuring devices to be avoided, so that both a cost reduction and a component reduction can additionally be achieved.

It is also advantageous if in an electrical switching device according to the invention the conductor contacts of the rotational component comprise a comb-like structure, at least in some sections, which mesh with a comb-like structure of the input contacts and the at least one output contact in a contacting manner. This comb-like structure can be designed, for example, with a trapezoidal cross-section, so that inclined faces can be moved past each other along their circumferential direction in a meshing and sliding manner. This leads to the fact that, with regard to its axial extent, overall a significantly larger surface area of an electrically conducting contact section can be made available between the contacts. At the same time it ensures that even over a large number of operations, and consequently also due to the forced abrasion between the individual components, an electrically conducting contact between the individual contacts is guaranteed with high reliability, in particular by means of an appropriate pre-tensioning device. For assembling or producing such a comb-like structure, for example, consecutively arranged axial discs extending over different radial distances can be used. The contacting is preferably effected only at the lateral comb surfaces, so that the base of each individual comb remains free and is therefore designed as non-contacting.

A further subject matter of the present invention is a method for switching an electric switching device, in particular in accordance with the present invention, for an energy accumulator of an electric vehicle, comprising the following steps:

monitoring the activity situation of the electric vehicle for detecting a normal condition, an emergency condition and a crash condition of the electric vehicle, moving a rotational component into an OFF position when an emergency or crash condition is detected In a method according to the invention therefore, the same advantages are achieved as those which have been explained in detail with reference to a switching device according to the invention.

Figure 2:
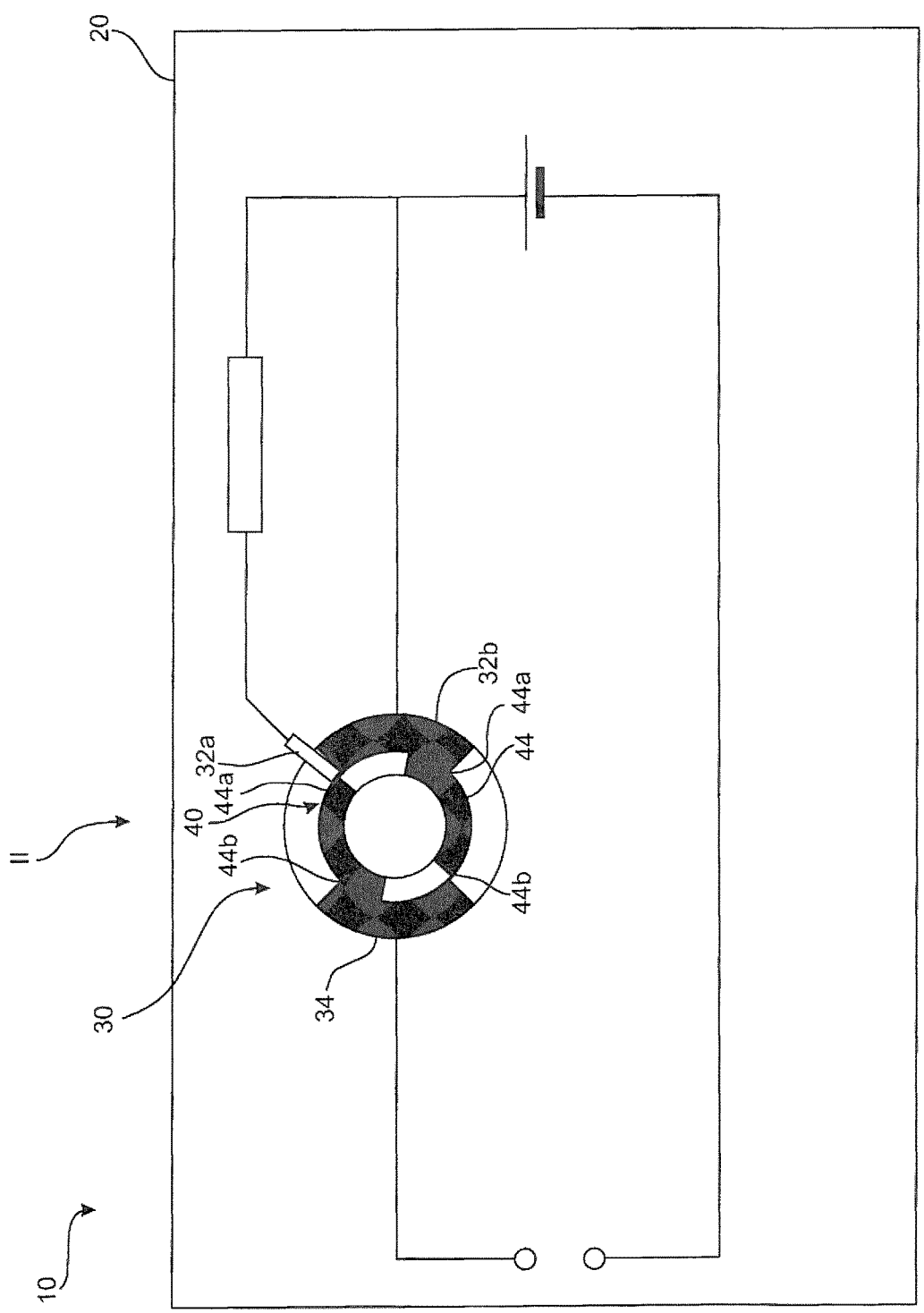
Figure 3:
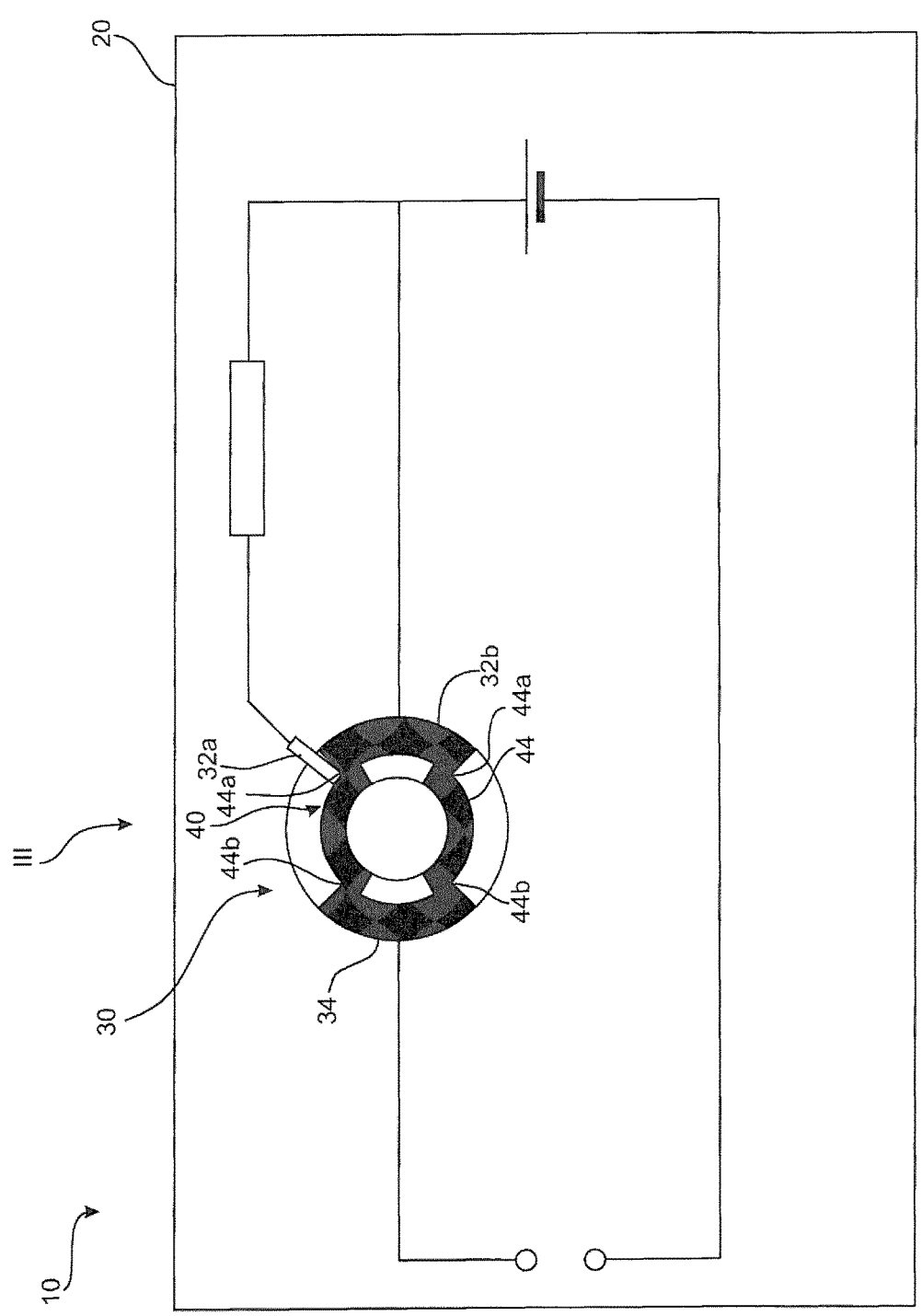
Figure 4:
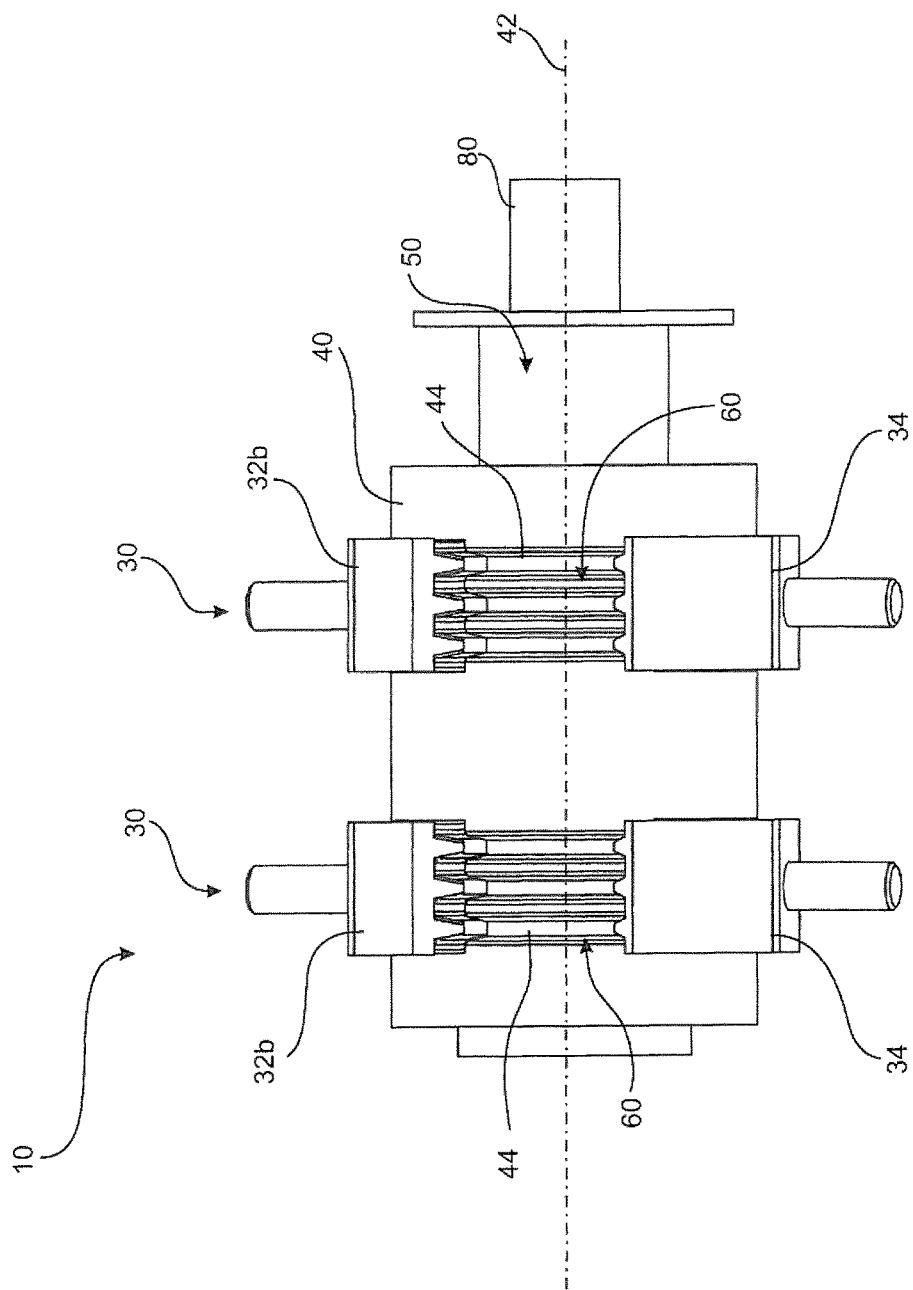
Figure 5:
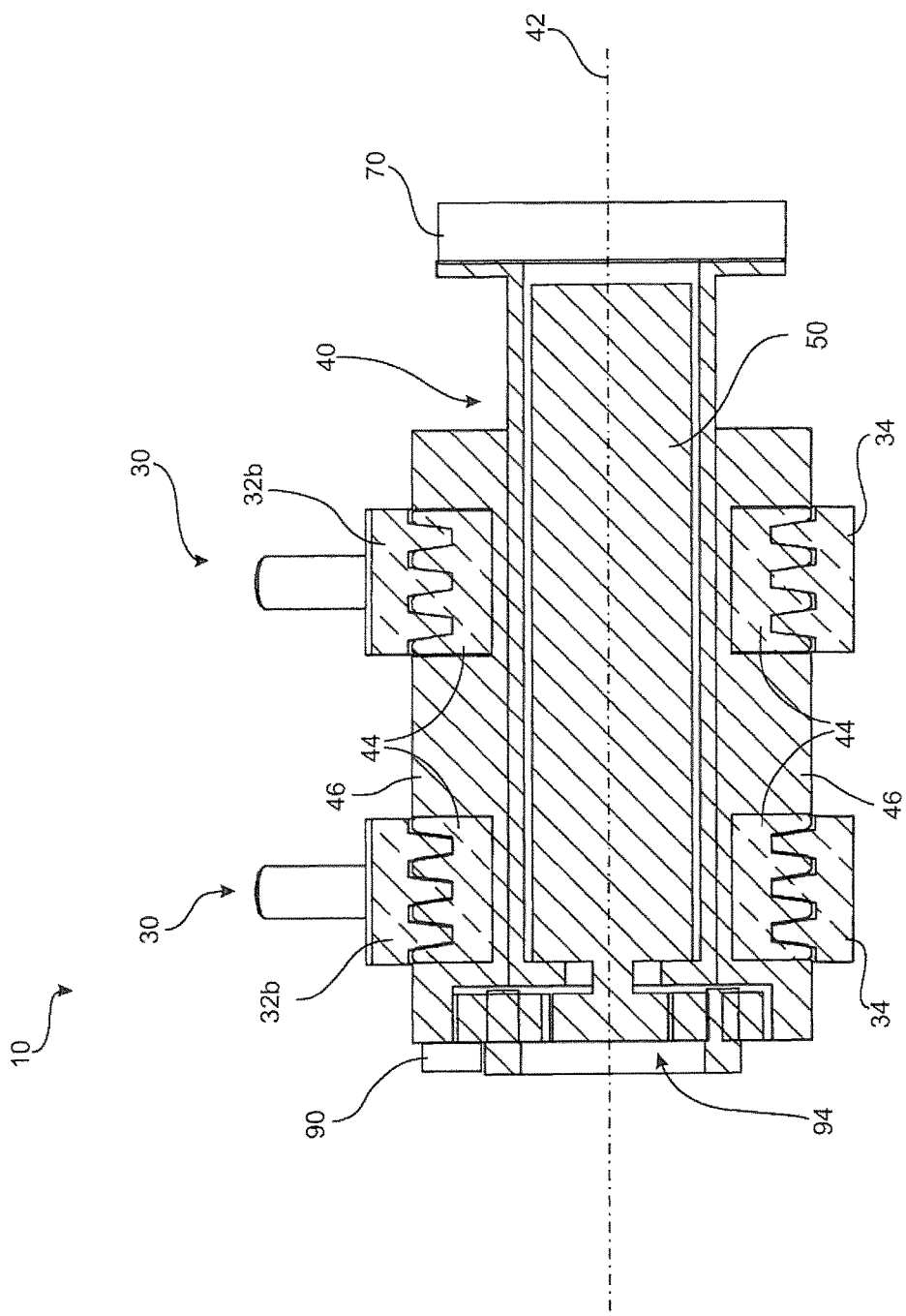
Figure 6:
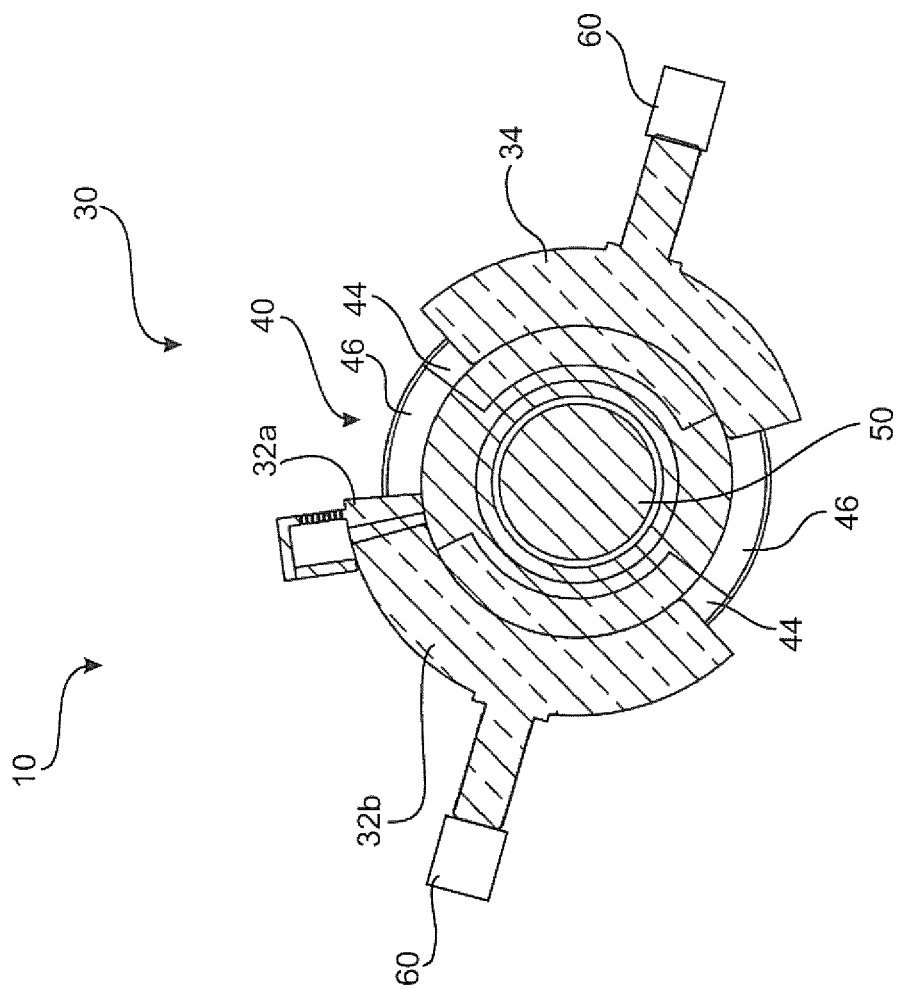
Figure 8:
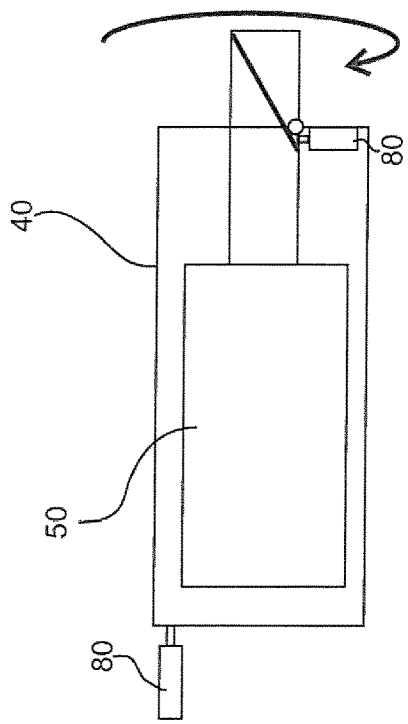
Figure 7:
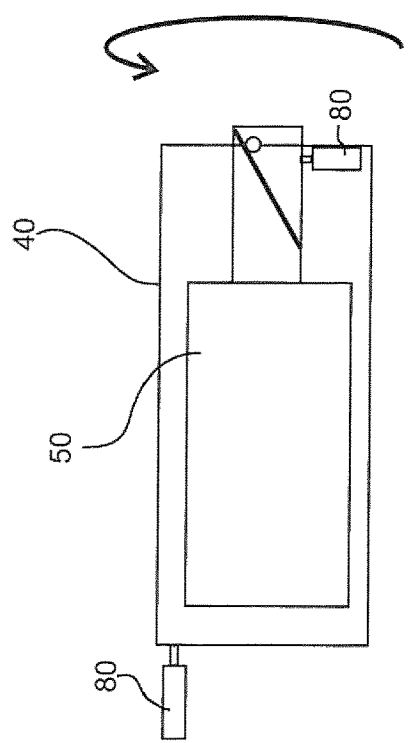

Other advantages, features, and details of the invention emerge from the following description, in which exemplary embodiments of the invention are described in detail by reference to the drawings. The features identified in the claims and in the description can be essential to the invention, either individually or in any desired combination. They show schematically:

FIG. 1 an embodiment of a switching device according to the invention in the OFF position, FIG. 2 the embodiment of FIG. 1 in the series-connecting position, FIG. 3 the embodiment of FIGS. 1 and 2 in the ON position, FIG. 4 a further embodiment of a switching device according to the invention, FIG. 5 the embodiment of FIG. 4 in another cross-section, FIG. 6 the embodiment of FIGS. 4 and 5 in another cross-section, FIG. 7 a possible design of a drive device and FIG. 8 the embodiment of the drive device of FIG. 7 in another operating state FIGS. 1 to 3 show schematically how a switching situation in an electric switching device 10 within a housing 20 can be changed. At the right-hand end an energy accumulator in the form of a power source is shown schematically, while on the left-hand end with the two circuits a load is arranged, for example in the form of an electric motor of an electric vehicle. The switching device 10 for the switching is here provided with a rotational component 30, which in FIG. 1 is shown in the OFF position I. This means that the rotational component 30 with its conductors 44, which here are drawn redundantly at the top and bottom, is in a rotational position in which electrically insulating material 46 isolates the corresponding wire contacts 44*a* from the output contact 34 or the two input contacts 32*a* and 32*b*, as appropriate. This ensures that the circuit must be open.

If the device is now required to be switched on, the rotational component 40 of the switching section 30 moves clockwise into a position as shown in FIG. 2. Here, the series-connecting position II is shown, which means that here the respective conductor contact 44*a* and 44*b* of the lower conductor 44 does not yet make contact with the output contact 34. But the right-hand conductor contact 44*a* of the upper conductor 44 is already in electrically conducting contact with the first input contact 32*a*, so that the circuit is now arranged in a first closed position via the large resistance at the top right. This resistance ensures that a current flow does not reach an undesirable level.

If the rotary movement of the rotational component 40 is now continued, the ON position III in accordance with FIG. 3 is reached. Here, both conductors 44 with both conductor contacts 44*a* and 44*b* are in electrically conducting contact with the second input contact 32*b* and the output contact 34, so that here the normal operating situation with a closed circuit is now shown.

FIGS. 4 to 6 indicate a further embodiment of an electric switching device 10, wherein here two axially offset switching sections 30 arranged in parallel are provided. These are provided with identical switching positions, so that a parallel and thus common switching of the switch sections 30 is possible.

As can also be easily identified here, the respective conductor contact 44*a* or 44*b* of the conductor 44 has a comb-like structure, which acts as a pre-tensioning means and correspondingly meshes with a comb-like surface structure of the output contacts 34 and the input contacts 32*a*, as can be identified in FIG. 5. As can also be identified, the conductors 44 extend along the circumferential direction on the surface of the rotational component, so that the inner cavity of the rotational component 40 remains free and is used here for the drive device 50 in the form of an electric motor.

If in accordance with the invention a switching movement is now required, then the drive device 50 is activated to move the rotational component 40 in a rotary manner via a gearbox 94 of an electric clutch device 90. In the case of a movement in the direction of the ON position III, a corresponding mechanical resistance in a mechanical reset device 70 is overcome, which is then stored there and is available as a return force. In an emergency OFF situation therefore this mechanical return force from the mechanical reset device 70 can be provided, in order to ensure the reverse rotation of the rotational component 40 about the switching axis 42. At the same time, in a simple manner and in particular effected by a low holding force, the electric clutch device 90 can be used to ensure a stop situation without the drive device 50 having to completely prevent the return movement by the mechanical reset device over the entire period of operation by appropriate application of a counter-force.

FIG. 6 also shows a cross-section through the embodiment of FIGS. 4 and 5, which is drawn in the direction of the axis 42. Here again, two pre-tensioning means 60 in the form of spring devices are shown, which ensure a radial adjustment and application of a pre-tensioning force for the output contact 34 and the input contact 32*a*. It can also be seen here how the first input contact 32*a* is designed as an additional resistance bridge, so as to ensure a corresponding second switching position. In addition, in the side view here it is also easy to see how the conductor 40 is embedded in electrically insulating material 46.

FIGS. 7 and 8 show an alternative version of a drive device in schematic form. Here, by means of a translational movement of a solenoid over a corresponding inclined ramp or screw-type construction, a rotational movement of the rotational component 40 can now be generated along the rotation arrow. At the same time, two possible designs of emergency switching devices 80 are shown. The emergency switching device 80 on the bottom right uses an engagement which directly provides a rotational movement, in particular by means of a pyrotechnic design. The emergency switching device 80 at the top left-hand end can ensure a translational movement which therefore allows a lateral displacement and thus a lateral release of the contacts in an emergency situation.

The preceding explanation of embodiments describes the present invention exclusively within the context of examples. Of course, the individual features of the embodiments, where technically feasible, can be freely combined with each other without departing from the scope of the present invention.

REFERENCE NUMERALS

10 electric switching device
20 housing
30 switching section
32*a* input contact
32*b* input contact
34 output contact
40 rotational component
42 switching axis
44 conductor
44*a* conductor contact
44*b* conductor contact
46 electrically insulating material
50 drive device
60 pre-tensioning means
70 mechanical reset device
80 emergency switching device
90 electrical clutch device
94 gearbox
I OFF position
II series-connecting position
III ON position

The invention claimed is:

1. An electrical switching device for an energy accumulator of an electric vehicle, the electrical switching device comprising:
a housing including (i) at least one switching section arranged therein and comprising a first input contact, a second input contact and at least one output contact, and (ii) a rotational component mounted relative to the housing, such that the rotational component is rotatable about a switching axis and between at least one of an OFF position (I), a series-connecting position (II), and an ON position (III),
wherein the rotational component comprises at least one conductor having at least two conductor contacts, which in the series-connecting position (II) connects the first input contact to the at least one output contact in an electrically conducting manner and in the ON position (III) connects the first input contact to the at least one output contact in an electrically conducting manner and the second input contact to the at least one output contact of the at least one switching section in an electrically conducting manner.

2. The electrical switching device according to claim 1, further comprising a drive device including an electric motor configured to rotate the rotational component.

3. The electrical switching device according to claim 2, wherein the drive device further comprises a solenoid and a conversion device configured to convert a translational movement of the solenoid into a rotational movement of the rotational component.

4. The electrical switching device according to claim 1, wherein at least one of (i) the conductor contacts, (ii) the first and second input contacts and (ii) the output contact is designed as a planar contact section configured to establish an electrical contact through the at least one conductor in at least two rotational positions of the rotational component.

5. The electrical switching device according to claim 1, wherein at least one of (i) the conductor contacts, (ii) the first input contact and the second input contact and (iii) the output contact is configured to provide pre-tensioned contacting between at least one of (i) the output contact and one of the conductor contacts and (ii) one of the first and second input contact and one of the conductor contact.

6. The electrical switching device according to claim 1, wherein the rotational component comprises a mechanical reset device including a spring device configured to apply a return force to the rotation component in a direction of the OFF position (I).

7. The electrical switching device according to claim 1, wherein the housing further includes at least two of the switching sections arranged axially offset with respect to each other in a direction of the switching axis.

8. The electrical switching device according to claim 1, further comprising an emergency switching device configured to provide a highly energetic, in particular pyrotechnic, disconnection of the electrically conducting connection through the at least one conductor by moving the rotational component, a direction of motion of which is preferably different to a rotation about the switching axis.

9. The electrical switching device according to claim 1, further comprising a drive device for the rotational component and an electric clutch device disposed between the drive device and the rotational component, the electric clutch device being arranged to block a movement of the rotational component in a direction of the OFF position (I) when supplied with current and to enable the movement of the rotational component in the direction of the OFF position (I) without a current supply.

10. The electrical switching device according to claim 9, wherein the electric clutch device comprises a freewheeling device for the drive device, which transmits a driving force of the drive device for a rotation in a direction of the ON Position (III), and in an opposite direction defining a freewheeling motion for the drive device.

11. The electrical switching device according to claim 9, wherein the electric clutch device comprises a gearbox including a planetary gearbox configured to transmit a driving force of the drive device onto the rotational component.

12. The electrical switching device according to claim 1, wherein the rotational component is formed, at least in some sections, from a conducting material, and wherein the at least two conductor contacts are formed by an arrangement of electrically insulating material next to the at least two conductor contacts.

13. The electrical switching device according to claim 1, wherein the at least one switching section comprises at least one of (i) at least one third input contact and (ii) at least one second output contact configured to form an electrically conducting connection by the conductor to an arc-extinguishing electrical component, being one of the following:
- a free-wheeling diode;
- a fuse device; and
- a resistor.

14. The electrical switching device according to claim 1, wherein the conductor, at least in some sections, is aligned along a circumferential direction of the rotational component between the at least two conductor contacts.

15. The electrical switching device according to claim 1, wherein the conductor comprises a measurement section with a defined electrical resistance, and wherein the electrical switching device includes a measuring device configured to determine an electric current in the measurement section.

16. The electrical switching device according to claim 1, wherein the at least two conductor contacts of the rotational component, at least in some sections, comprise a comb-like structure, which meshes with a comb-like structure of the first and second input contacts and the at least one output contact in a contacting manner.

17. A method for switching an electrical switching device for an energy accumulator of an electric vehicle,
wherein the electrical switching device includes a housing including (i) at least one switching section arranged therein and comprising a first input contact, a second input contact and at least one output contact, and (ii) a rotational component mounted relative to the housing, such that the rotational component is rotatable about a switching axis and between at least one of an OFF position (I), a series-connecting position (II), and an ON position (III),
wherein the rotational component comprises at least one conductor having at least two conductor contacts, which in the series-connecting position (II) connects the first input contact to the at least one output contact in an electrically conducting manner and in the ON position (III) connects the first input contact to the at least one output contact in an electrically conducting manner and the second input contact to the at least one output contact of the at least one switching section in an electrically conducting manner, and
wherein the method comprises:
monitoring an activity situation of the electric vehicle to detect a normal condition, an emergency condition and a crash condition of the electric vehicle,
moving the rotational component of the electrical switching device into the OFF position (I) when one of the emergency condition is detected and the crash condition is detected.

18. The electrical switching device of claim 1, wherein the connection between the first input contact to the at least one output contact is maintained when transitioning from the series-connecting position (II) and the ON position (III).

* * * * *